US008483131B2

(12) United States Patent
Liu et al.

(10) Patent No.: US 8,483,131 B2
(45) Date of Patent: Jul. 9, 2013

(54) METHOD FOR NEGOTIATING AND TRANSMITTING LENGTH INFORMATION OF LOCATION UPDATE TIME

(75) Inventors: Junyi Liu, Shenzhen (CN); Donghua Chen, Shenzhen (CN); Hongyue Sun, Shenzhen (CN); Chong Ji, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 762 days.

(21) Appl. No.: 12/666,237

(22) PCT Filed: Nov. 12, 2007

(86) PCT No.: PCT/CN2007/003187
§ 371 (c)(1),
(2), (4) Date: Dec. 22, 2009

(87) PCT Pub. No.: WO2009/000116
PCT Pub. Date: Dec. 31, 2008

(65) Prior Publication Data
US 2010/0189036 A1 Jul. 29, 2010

(30) Foreign Application Priority Data
Jun. 22, 2007 (CN) .......................... 2007 1 0123025

(51) Int. Cl.
*H04W 4/00* (2009.01)
*H04W 36/00* (2009.01)
(52) U.S. Cl.
USPC ........... 370/328; 370/329; 370/331; 455/436; 455/434; 455/433
(58) Field of Classification Search
USPC ................. 370/328, 329, 331; 455/436, 434, 455/433
See application file for complete search history.

(56) References Cited

U.S. PATENT DOCUMENTS
2001/0015963 A1* 8/2001 Tuomainen et al. .......... 370/311
(Continued)

FOREIGN PATENT DOCUMENTS
CN 1802024 A 7/2006
WO 2006/049457 A2 11/2006

OTHER PUBLICATIONS
"Part 16: Air Interface for Fixed and Mobile Broadband Wireless Access Systems; Amendment for Physical and Medium Access Control Layers for Combined Fixed and Mobile Operation in Licensed Bands." IEEE P802.16e/D9, Jun. 2005.
Written Opinion of the International Searching Authority, PCT/CN2004/003187, mailed Apr. 3, 2008.

*Primary Examiner* — Christopher M Brandt
*Assistant Examiner* — Muthuswamy Manoharan
(74) *Attorney, Agent, or Firm* — Kunzler Law Group

(57) ABSTRACT

A method for negotiating and transmitting location update time length information, applied in a Wimax network architecture, comprises: a mobile station initiating a request for initially accessing a network, a request for entering an idle mode, or a request for a location update to a services access service network gateway; when receiving said request, said services access service network gateway negotiating an idle mode timer length, and notifying said mobile station of the negotiated idle mode timer length. The present invention can implement the negotiation and transmission of location update time length information between access service network gateways as well as between an access service network gateway and a mobile station in a Wimax network so that the location update time lengths of the network side and the mobile station maintain consistent.

22 Claims, 8 Drawing Sheets

U.S. PATENT DOCUMENTS

2005/0197125 A1* 9/2005 Kang et al. .................... 455/439
2007/0087767 A1* 4/2007 Pareek et al. ................. 455/502
2008/0084842 A1* 4/2008 Xiang et al. .................. 370/329
2008/0205319 A1 8/2008 Wu et al.

* cited by examiner

METHOD FOR NEGOTIATING AND TRANSMITTING LENGTH INFORMATION OF LOCATION UPDATE TIME

TECHNICAL FIELD

The present invention relates to a World Interoperability for Microwave Access (Wimax) network, and more specifically, to a method for negotiating and transmitting location update time length information between access service network gateways (ASN-GW) as well as between an access service network gateway and a mobile station in the Wimax network.

BACKGROUND OF THE INVENTION

The World Interoperability for Microwave Access Forum (Wimax Forum) is a non-profit organization consisting of leading system equipment manufacturers, component (including chips, RFs, antennae, and so on) suppliers, software suppliers and service suppliers, and has successively established a certification working group (CWG), a technical working group (TWG), a spectrum working group (RWG), a market working group (MWG), a requirements working group (SPWG), a network working group (NWG) and an application working group (AWG).

The NWG makes and researches the Wimax network architecture specification, and the work is divided into three stages of release versions as desired by the developing process. So far, Release1.0.0 has been issued, and the version is further divided into the following three stages: Stage1 is carried out in the SPWG, and the objective is to define requirements for functions and performances of the network in nomadic, portable, simple moving and all mobile modes; Stage2 and Stage3 are carried out in the NWG, and the task of Stage2 is to make a network architecture reference model, define reference points and network functions, and give interpretations of the protocol and flow; Stage3 is to refine the implementation of the protocol and flow on the basis of Stage2.

FIG. 1 illustrates the Wimax network architecture reference model, and FIG. 2 and FIG. 3 depict a functional decomposition model of an access service network (ASN).

The model in FIG. 1 is a network reference model based on 802.16. The reference model consists of three logical entities: a mobile station (MS)/stable station (SS), an access service network (ASN) and a connection service network (CSN), and the logical entities connects with one another via standard reference points (RP) R1 to R5. Each logical entity represents a group of functional entities, and each function can be implemented in a single physical device or in distributed multiple physical devices.

The reference points will be described in detail below:

Reference point R1: this reference point is an interface between the SS/MS and the ASN, and is consistent with the physical layer and MAC layer of the IEEE 802.16e-2005 or IEEE 802.16d-2004 air interface, moreover, the reference point R1 may also comprise an additional protocol of management plane;

Reference point R2: this reference point is a logical interface between the SS/MS and the CSN, and it is established on the physical connection between the SS/MS and the CSN, for authentication, service authorization, IP host configuration management, and so on. Wherein, the authentication function of the reference point R2 is performed between the mobile station (MS) and the CSN of the home network service provider (H-NSP), and under a roaming mode, the ASN and the CSN of the visited network service provider (V-NSP) can also process part of the authentication flow and mechanism; the IP host configuration management can be performed between the MS and the NSP of the home place or the CSN of the visited place;

Reference point R3: this reference point is an interoperability interface between the ASN and the CSN, comprises a series of protocols of control and bearer plane, and supports AAA, policy enforcement and mobility management. In addition, the reference point R3 may also comprise a method, such as tunnel establishment, for bearer plane data transmission between the ASN and the CSN;

Reference point R4: this reference point consists of a series of control and management plane protocols initiated and terminated inside the ASN, and is used to implement functions associated with the MS mobility coordination between multiple ASNs and an access network gateway (ASN-GW), moreover, the reference point R6 inside the ASN (see FIG. 2) can also implement the same functions;

Reference point R5: this reference point consists of a series of control and bearer plane protocols for the interoperability between the visited CSN and the home CSN;

Reference point R6: description of the reference point R4 can be referred to.

The ASN administrates an IEEE 802.16 air interface and provides wireless access for WiMAX users. The ASN consists of at least one BS and one ASN gateway (GW), and it may comprise a single ASN-GW or multiple ASN-GWs. FIG. 2 and FIG. 3 respectively illustrates an ASN reference model with a single ASN-GW and an ASN reference model with multiple ASN-GWs.

In FIG. 3, ASN connects with the MS at the reference point R1, connects with the CSN at the reference point R3, and connects with another ASN at the reference point R4. The reference point R4 is a unique reference point connecting ASNs of identical or different ASN Profiles on control and bearer planes. Different types of ASNs can connect with the original ASN via specific protocols on R1, R3 and R4. If an ASN consists of n (n>1) ASN-GWs (as illustrated in FIG. 3), the mobility inside the ASN relates to establishment of control messages and a bearer plane of R4. For all application protocols and flows, the reference point R4 inside the ASN should be completely compatible with the reference point R4 between ASNs.

The base station is a logical entity, and a base station instance can implement the MAC and physical layers specified in IEEE 802.16 standards. A base station instance represents a sector operating on a frequency, and it comprises uplink and downlink scheduling functions, implementation of which depends on the equipment manufacturer and is without the scope of the network architecture specification. With regard to load balancing and redundancy, a single BS may be required to connect to more than one ASN-GW (that is, the case illustrated in FIG. 3, in which reachability of the above ASN-GWs can be achieved).

The ASN-GW is also a logical entity and represents a set of control plane functional entities, and these functions may have peers of corresponding functions (such as functions in the CSN in the BS instance or functions in another ASN) in the ASN (such as paging controller, authenticator, which will be described below, data path function (DPF), and so on). In addition, the ASN-GW can also perform bearer plane routing or network bridge function.

The components will be described in detail below.

Authenticator: the authenticator has its definition in each standard EAP three party model. The authenticator, located at one end of a point-to-point link, is a unit helping a MS to connect to the other end for authentication. Before permitting a terminal to access a service, the authenticator performs compulsory authentication. The authenticator can also comprise an AAA client communicating with a certification server based on AAA and providing authentication service for the authenticator via the AAA protocol. Generally, the authenticator is located at the same location as a key distribution device, or may be located at the same location as an authentication relay and a key reception function. In this disclosure, the authenticator, as a functional entity of an ASN-GW, resides in the ASN-GW.

Paging controller (PC): the paging controller is a functional entity administrating acts of MSs under the idle mode in a network. In IEEE802.16e, it is identified by a 6-byte PC ID which can be mapped to the address of the functional entity inside an NWG. In this regard, the paging controller (PC) can either reside in a BS (without the consideration of NWG) or separate from the BS and reside in an ASN-GW via the reference point R6.

At present, there are mainly two types of paging controllers:

Anchor PC: for each MS in the idle mode, there must be a PC (the Anchor PC) comprising location information of the MS.

Relay PC: in the network, there may also be one or more PCs (Relay PC) which transmit paging or location management messages between the BS of the PA (Paging Area) and the anchor PC.

The NWG Stage2/Stage3 protocol defines MS operation functions in paging and idle modes, and the functions require consistency with the relevant functions in IEEE 802.16e. The idle mode is mainly for an MS to decrease its power consumption to prolong its working hours in the case that there is no service being processed, and in the idle mode, the MS is not registered on a specific BS, and it can access the network by paging and location update in a paging interval.

An idle mode timer is defined in IEEE 802.16e, and an MS must initiate a location update before the timer expires, and after the location update is completed, the MS and the network side will both reset the timer, and if there is no location update initiated when the timer expires, the network side considers that the MS is not in the network and releases all the resources associated with the MS, and the MS should also consider that the network side no longer has a context associated with it. Therefore, the location update flow can be considered as a method for the network side to periodically detect whether an MS in the idle mode is still in the current Wimax network.

In the Wimax network architecture, the location update flow is part of the paging controller functional entity management (the scenario in which a paging controller and a BS are combined is without the consideration of this disclosure as well as the scope defined by NWG, and is within the scope defined by IEEE 802.16e), what is considered in this disclosure is a scenario in which a paging controller resides in an access service network gateway entity, and in this scenario, the paging controller interacts with a paging agent (a functional entity residing in a BS to implement the paging function defined in IEEE 802.16e and to interact with a PC via R6 interface or an inner interface) to implement relevant message interchange, and messages between paging controllers are interchanged via the reference point R4.

However, neither behaviors related to the idle mode timer nor description related to the periodical location update is defined in the standard flows and messages of the NWG Stage2 and Stage3 protocols. Besides, there is no relevant solution proposed to date.

SUMMARY OF THE INVENTION

The technical problem to be solved by the present invention is to provide a method for negotiating and transmitting location update time length information, which can implement the negotiation and transmission of location update time length information between access service network gateways as well as between an access service network gateway and a mobile station in a Wimax network so that the location update time lengths of the network side and the mobile station maintain consistent.

In order to solve the above technical problem, the present invention provides a method for negotiating and transmitting location update time length information, applied in a Wimax network architecture, the method comprising the following steps of:

step 1, a mobile station initiating a request for initially accessing a network, a request for entering an idle mode, or a request for a location update to a services access service network gateway; and step 2, when receiving said request, said services access service network gateway negotiating an idle mode timer length, and notifying said mobile station of the negotiated idle mode timer length.

Furthermore, the above method further comprises:

the request for initially accessing the network, the request for entering the idle mode, and the request for a location update all carrying idle mode timer length information when these requests are initiated by said mobile station;

an authenticator or anchor paging controller in the services access service network gateway at the network side performing the negotiation according to a preset negotiation strategy, and sending the negotiated length to the mobile station.

Furthermore, the above method further comprises:

during a registration for the first time, said mobile station negotiating an idle mode timer length with an authenticator, and said services access service network gateway storing the idle mode timer length; afterwards, said mobile station no more initiating a negotiation of an idle mode timer length when entering the idle mode or initiating a location update, said authenticator transmitting the length information to an anchor paging controller of said mobile station, and the anchor paging controller which has obtained the length information transmitting the length information to a new anchor paging controller to maintain synchronous; or when entering the idle mode, said mobile station negotiating an idle mode timer length with an anchor paging controller, and said anchor paging controller storing the idle mode timer length; afterwards, said mobile station no more initiating a negotiation of an idle mode timer length when initiating a location update, and if the anchor paging controller of said mobile station migrates, then the original anchor paging controller transmitting the length information to a new anchor paging controller to maintain synchronous.

Furthermore, the above method further has the following feature:

a negotiation strategy used by an authenticator or an anchor paging controller in said services access service network gateway is: directly using an idle mode timer length carried in one of the requests, using an idle mode timer length preset locally, or using an idle mode timer length previously negotiated.

Furthermore, the above method further has the following feature:

a way in which the negotiated idle mode timer length is notified through a response message is as follows:

if the negotiated idle mode timer length is not a length carried in one of said requests, then the negotiated idle mode timer length is carried in the response message; if the negotiated idle mode timer length is just a length carried in one of said requests initiated by said mobile station, then the length is not carried in the response message, which indicates that use of the length is agreed by default.

Furthermore, the above method further has the following feature:

in the case that a request initiated by the mobile station carries an idle mode timer length, a response message returned to said mobile station by a base station carries a negotiated idle mode timer length; or if the negotiated idle mode timer length is the length carried in the request initiated by said mobile station, the response message returned to said mobile station does not carry the length, which indicates that use of the length in said request is agreed by default.

Furthermore, the above method further comprises:

before said idle mode timer expires, said mobile station having to initiate a location update in the network where the mobile station is located, and when the location update is completed, said mobile station and the network where the mobile station is located both resetting said idle mode timer, and in the case that said mobile station never initiates a location update when said idle mode timer expires, the network where the mobile station is located releasing resources associated with said mobile station.

Furthermore, the above method further comprises:

said mobile station negotiating an idle mode timer length when initiating the request for initially accessing the network, and said authenticator storing the negotiated idle mode timer length, afterwards, when said mobile station initiates the request for entering the idle mode, said anchor paging controller obtaining the length from the authenticator; or when said mobile station initiates a request for initially accessing the network again, during a negotiation, the authenticator directly taking the length stored as a negotiated length.

Furthermore, the above method further comprises:

when the anchor paging controller of said mobile station initiates a request for entering the idle mode and a request for a location update, and said anchor paging controller sends a new idle mode timer length to the mobile station, said anchor paging controller needing to update the length value in the authenticator, that is, sending a context report message carrying the new idle mode timer length negotiated to said authenticator; said authenticator storing the new idle mode timer length and sending a context acknowledgement message to said anchor paging controller.

Furthermore, the above method further has the following feature:

when the negotiated idle mode timer length is notified through a response message, no matter whether the negotiated idle mode timer length is a length carried in one of the requests initiated by said mobile station or not, the negotiated idle mode timer length is carried in the response message.

With the above technical scheme of the present invention, the idle mode timer mechanism defined in IEEE 802.16e can be introduced into an access service network gateway, to fill a gap in relevant technologies.

BRIEF DESCRIPTION OF THE DRAWINGS

The accompanying figures illustrated herein are used to provide further understanding of the present invention, and constitute a part of this application; the present invention's exemplary embodiments and description thereof are used to explain the present invention and do not constitute a limitation of the present invention. In the accompanying figures.

Figure 1:
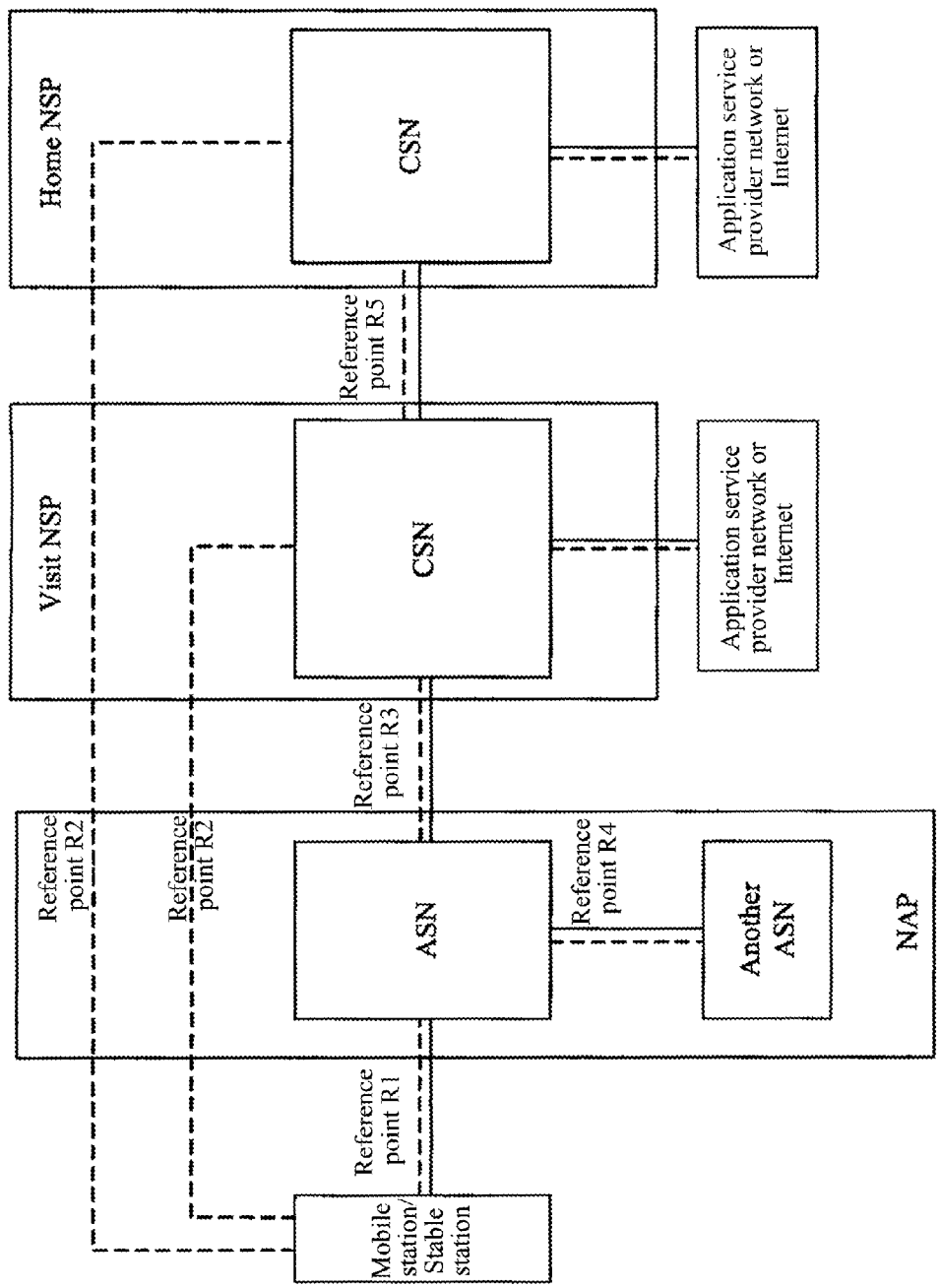
FIG. 1 is a block diagram of the Wimax network architecture reference model in accordance with relevant technologies.
Figure 2:
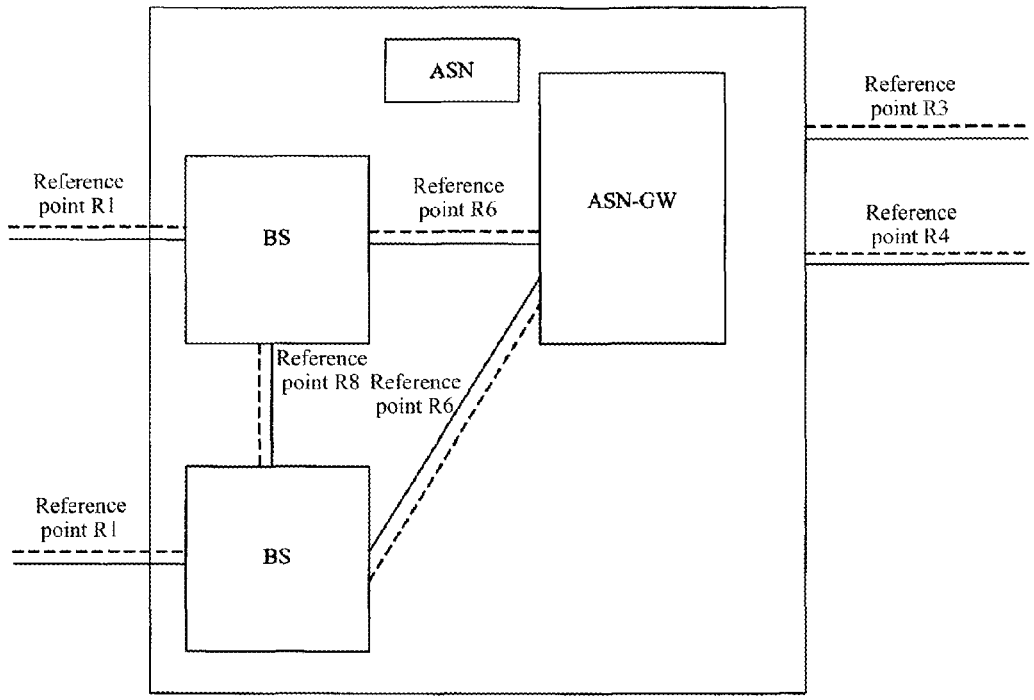
FIG. 2 is a block diagram of the ASN reference model with a single ASN-GW in accordance with relevant technologies.
Figure 3:
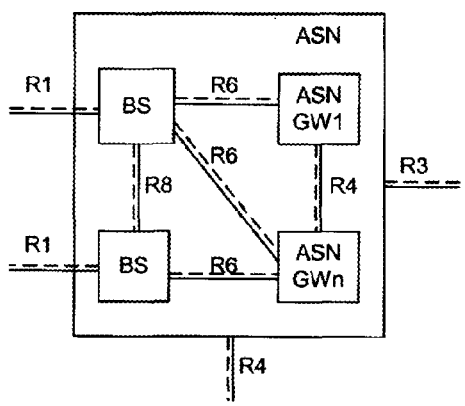
FIG. 3 is a block diagram of the ASN reference model with multiple ASN-GWs in accordance with relevant technologies.

In the above figures, a dashed line represents a message of the control plane and a solid line represents a message of the bearer plane.

PREFERRED EMBODIMENTS OF THE PRESENT INVENTION

The objective of the present invention is to enable devices at the network side, such as Anchor-PC and MS, to use an effective idle mode timer value, and maintain consistent. In regard to this, there are two modes:

In the first mode, an MS loads timer length information into all request messages to a network side, the network side performs negotiation and sends a negotiated length to the MS (the length in the request message of the MS by default or directly carrying length information) to ensure that the MS and the network use the same timer length to maintain synchronous.

That is, during each location update, the timer negotiation can be performed, this field will not bring special loss for message processing and judgment, and no matter whether the timer resource applies negotiation or always uses the same value, it will not become a bottleneck of a product for the MS or ASN-GW, and the negotiation every time brings an advantage of increasing the flexibility of the processing by the network and terminals.

In the second mode, an MS negotiates the timer length with a network side (authenticator or anchor paging controller) when initiating a request for initially accessing the network (or entering the idle mode), and there can be no more negotiation afterwards; a network element storing the information, such as an authenticator in a services access service network gateway or the original anchor paging controller, sends the length information to an anchor paging controller which uses the timer length to periodically detect the activity of the user in the idle mode, so as to maintain synchronous.

If the mobile station negotiates the idle mode timer length with the authenticator when initially accessing the network, and the services access service network gateway stores the idle mode timer length; afterwards, the mobile station no more initiate a negotiation of the idle mode timer length when entering the idle mode as well as initiating a location update, and the authenticator sends the length information to the anchor paging controller of the mobile station, and the anchor paging controller which has obtained the length information sends the length information to a new anchor paging controller to maintain synchronous; alternatively The mobile station negotiates the idle mode timer length with the anchor paging controller when entering the idle mode, and the idle mode timer length is stored by the anchor paging controller; afterwards, the mobile station no more initiates a negotiation of the idle mode timer length when initiating a location update, and if the anchor paging controller of the mobile station migrates, then the original anchor paging controller sends the length information to a new anchor paging controller to maintain synchronous.

Embodiments of the present invention will be described in detail with reference to the accompanying figures. Implementation of the present invention is based on protocol specifications (including Stage 2 and Stage3) associated with Release1.0.0 issued by the NWG, and messages between a mobile station and a base station belong to the messages defined in IEEE 802.16e, without the scope defined by the NWG, and this disclosure relates to a messaging flow between a base station (BS) and an access service network gateway.

The First Embodiment

Figure 4:
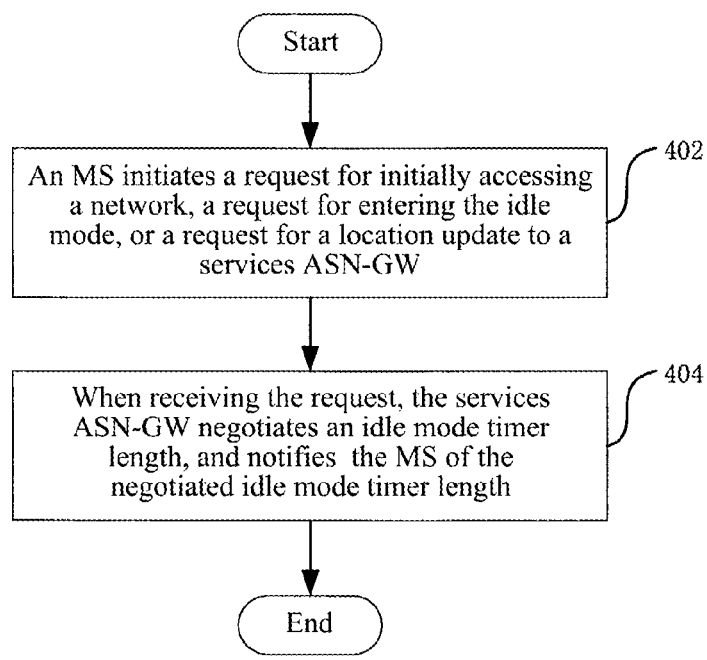
FIG. 4 is a flow chart of a method for negotiating and transmitting location update time length information in accordance with a first embodiment of the present invention.

The method for negotiating and transmitting location update time length information in this embodiment applies the first mode. As illustrated in FIG. 4, this method comprises:

Step S402, a mobile station (MS) initiates a request for initially accessing a network, a request for entering the idle mode, and a request for a location update to a services access service network gateway (services ASN-GW);

The above requests carry an idle mode timer length to be negotiated, and the idle mode timer herein may also use another name, as long as it is used to time the location update time length, it shall be an equivalent substitution.

Step S404, the services access service network gateway negotiates an idle mode timer length when receiving the requests, and notifies the mobile station of the negotiated idle mode timer length;

If the negotiated idle mode timer length is not the length carried in the requests, then the negotiated idle mode timer length will be carried in a response message from the anchor paging controller to the services access service network gateway and/or a response message from the services access service network gateway to the base station; if the negotiated idle mode timer length is just the length carried in the requests initiated by the mobile station, then the length will not be carried in the response message from the anchor paging controller to the services access service network gateway as well as the response message from the services access service network gateway to the base station, which indicates that use of the value is agreed by default. Of course, the negotiated idle mode timer length can always be carried in the response messages regardless whether the negotiated idle mode timer length is the length carried in the requests initiated by the mobile station or not.

A response message from the BS to the mobile station is within the scope specified in the air-interface protocol, and the negotiated idle mode timer length can be carried in the response message in any case, or not carried in the response message when use of the length in the requests is agreed by default.

The negotiation strategy may be: the anchor paging controller or authenticator at the network side presetting an idle mode timer length locally, and in the case that an idle timer length is carried in a request from the MS, directly using the idle mode timer length carried in the request or using the idle mode timer length preset locally, or when the anchor paging controller or authenticator at the network side has negotiated an idle mode timer length, using the originally negotiated value in the next negotiation or transmission. In the case that the requests from the MS do not carry the idle mode timer length, the idle mode timer length preset locally is used.

When the negotiation is completed, before the idle mode timer expires, the MS has to initiate a location update in the network where the MS is located, and after the location update, the MS and the network where the MS is located both reset the idle mode timer, and in the case that the MS has not initiated the location update when the idle mode timer expires, the network where the MS is located releases the resources associated with the MS, and the MS also considers that there is no context associated with it at the network side.

Cases in which the method of this embodiment is applied in practice will be described in detail below.

Instance 1

In this instance, the processing performed by a user when initially accessing a network based on the method illustrated in FIG. 4 is described.

The method for negotiating and transmitting location update time length information according to the instance comprises:

Step 1, the MS accesses the network and sends a registration request to the BS, the registration request carrying an idle mode timer length;

Step 2, the BS initiates an MS attachment request to a services access service network gateway, the MS attachment request carrying the idle mode timer length obtained from the MS;

Step 3, the services access service network gateway negotiates an idle mode timer length according to a negotiation strategy, and if the services access service network gateway uses the same idle mode timer length as that in the MS attachment request message, then the timer length is not required to be carried in an MS attachment response and sent to the BS, otherwise, it is required to be sent to the BS through the MS attachment response;

Step 4, the BS sends a registration response to the MS, the registration response carrying the negotiated idle mode timer length, if the MS attachment response message does not carry the idle mode timer length, then the idle mode timer length in the registration response message uses the idle mode timer length value in the registration request message, and meanwhile, the BS sends the MS attachment acknowledgement message to the services access service network gateway, so that a data bearer channel is established among the MS, BS and services access service network gateway.

The above processing will be described in detail below with reference to FIG. 5.

Figure 5:
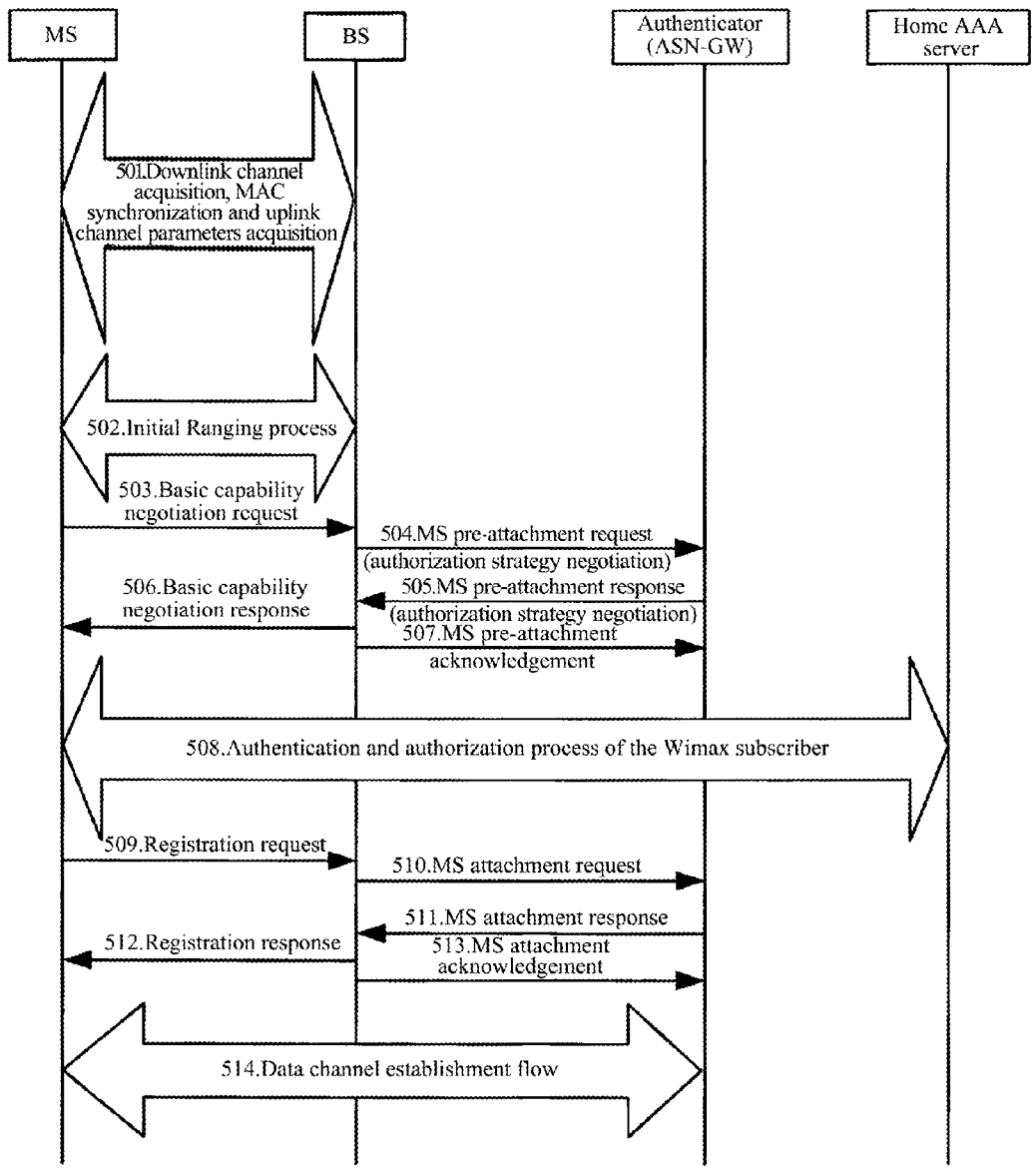
FIG. 5 is a signaling flow chart of processing instance 1 of the method for negotiating and transmitting location update time length information in accordance with the first embodiment of the present invention.

FIG. 5 illustrates a signaling flow of the processing performed when initially accessing a network based on the method illustrated in FIG. 4. As illustrated in FIG. 5, it specifically comprises the following processing:

Steps S501 to S508 are certification and authorization processes of a Wimax subscriber initially accessing a network, and these processes have been disclosed in relevant technologies and are known, so description of them is omitted here;

Step S509, the MS initiates a registration request to the BS through a "registration request" (REG_REQ) message carrying an idle mode timer length;

Step S510, the BS initiates an attachment request through an "MS attachment request" (MS_Attach_Req) message, and adds an Idle Mode Timer field therein, the value can be obtained from the REG_REG message of the MS, and is taken as a timer length that the MS requests to be negotiated;

Step S511, an authenticator negotiates an Idle Mode Timer value according to a strategy, and sends the negotiated Idle Mode Timer value to the BS through an "MS attachment response" (MS_Attach_Rsp) message, and if the authenticator uses the Idle Mode Timer value in the attachment request message, then the value is not required to be sent to the BS;

Step S512, the BS sends a "registration response" (REG_RSP) message to the MS, the message containing the Idle Mode Timer value negotiated by the authenticator, and if the attachment response message does not contain the Idle Mode Timer value, then the Idle Mode Timer value in the attachment request message sent to the authenticator by the BS can be used;

Step S513, the BS sends a "MS attachment acknowledgement" (MS_Attachment_Ack) message to the authenticator to acknowledge that the "registration response" (REG_RSP) message has been sent;

Step S514, a data bearer channel is established among the MS, BS and access service network gateway.

Instance 2

In this instance, the processing performed when entering the idle mode based on the method illustrated in FIG. 4 is described.

This instance provides a method for negotiating and transmitting location update time length information. The method comprises the following steps:

Step 1, an MS sends an deregistration request indicating entering the idle mode to the BS, the deregistration request carrying idle mode timer length information;

Step 2, when receiving the deregistration request, the BS sends an idle mode entry state change request message to a services access service network gateway, the idle mode entry state change request message carrying the idle mode timer length obtained from the MS;

Step 3, the services access service network gateway forwards the idle mode entry state change request message to an anchor paging controller at the network side, and the anchor paging controller acquires security context information from an authenticator;

Step 4, the anchor paging controller negotiates an idle mode timer length, supposing the negotiated idle mode timer length differs from the idle mode timer length carried in the deregistration request, then the anchor paging controller sends an idle mode entry state change response message carrying the negotiated idle mode timer length to the services access service network gateway;

Herein, the negotiation strategy used by the anchor paging controller can be using a value preset locally, the value carried in the deregistration request, or a value originally negotiated (if the negotiation has been done, for the first location update, before the negotiation, a step of obtaining the idle mode timer length negotiated during the registration from the authenticator can be added), or the like.

Step 5, the services access service network gateway forwards the idle mode entry state change response to the BS, and the BS sends an deregistration response carrying the negotiated idle mode timer length to the MS, and meanwhile, sends an idle mode entry acknowledgement message to the services access service network gateway which in turn sends the idle mode entry acknowledgement message to the anchor paging controller; and Step 6, the anchor paging controller notifies an anchor data channel functional entity that the MS has entered the idle mode, deletes the data channel between the services access service network gateway and the anchor data channel functional entity, and updates a security parameter of the air interface.

In the step 4 of the above process, if the negotiated idle mode timer length is just the idle mode timer length carried in the deregistration request, the negotiated length may not be required to be carried in the message sent to the services access service network gateway by the anchor paging controller as well as the message sent to the BS by the services access service network gateway, which indicates that use of the idle mode timer length carried in the deregistration request is agreed by default. The idle mode timer length may be carried or not carried in the deregistration response of the BS.

In addition, in the case of non-roaming, the local services access service network may comprise multiple access service network gateways, and the services access service network gateway and the anchor paging controller can be combined, or separate. When the two components are combined, in the above flow and the specific flow to be described below, the message interchange between the services access service network gateway and the anchor paging controller can be cancelled, which is the same case as those in Instance 3 and Instance 4 and will not be repeated in the following.

The above processing will be described in detail below.

Figure 6:
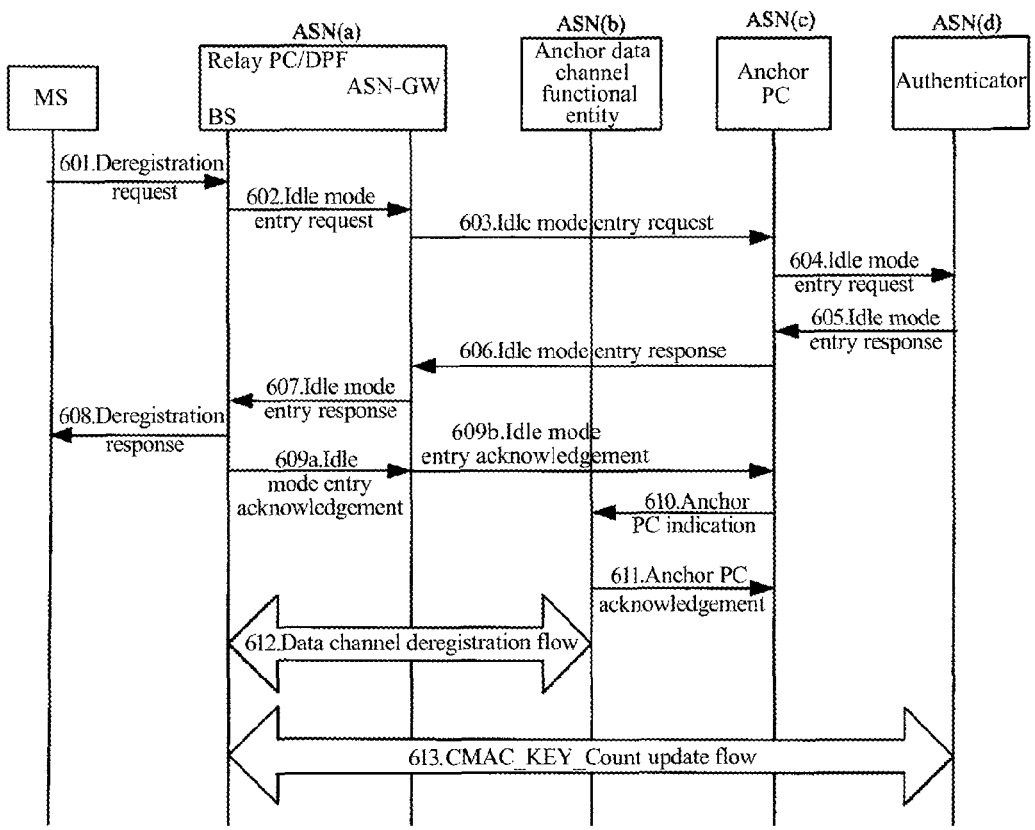
FIG. 6 is a signaling flow chart of processing instances 2 and 5 of the method for negotiating and transmitting location update time length information in accordance with the first embodiment of the present invention.

FIG. 6 illustrates a signaling flow of an example of the processing performed when entering the idle mode based on the method illustrated in FIG. 4. In the following description, the signaling message interchange performed during the process of entering the idle mode enables an MS to enter the idle mode, and the process comprises two parts: Steps S601-S608, which mainly relate to the message interchange for entering the idle mode between the MS and a paging controller, and Steps S609-S613, which relate to the release and update of relevant network resource.

As shown in FIG. 6, it specifically comprises the following processing:

Step S601, the MS sends a "deregistration request" (DREG_REG) message to the BS, indicating entering Idle, and idle mode timer length information is carried in the message;

Step S602, the BS sends an "idle mode entry state change request" (IM_Entry_State_Change_Req) message to a services access service network gateway (also referred to as Relay PC in the following, because relevant operations are performed by a Relay PC in the services access service network gateway), and adds an Idle Mode Timer field in the message, and the value can be obtained from the DREG_REQ message of the MS and taken as a timer length value that the MS requests to be negotiated;

Step S603, the Relay PC forwards the IM_Entry_State_Change_Req to an anchor PC;

Steps S604 and S605, the Anchor PC acquires a security context from an authenticator;

Step S606, the Anchor PC negotiates an Idle Mode Timer value according to a strategy of it, and sends the negotiated Idle Mode Timer value to the Relay PC through an "idle mode entry state change response" (IM_Entry_State_Change_Rsp) message;

Herein, it is also supposed that the negotiated idle mode timer length differs from the idle mode timer length carried in the deregistration request, and for the processing in the case that they are the same, please refer to the former description.

Step S607, the Relay PC forwards the IM_Entry_State_Change_Rsp to the BS;

Step S608, the BS sends a "deregistration response" (DREG_RSP) message to the MS, the message containing the Idle Mode Timer value negotiated by the Anchor PC;

Steps S609a and S609b, from the BS to the Relay PC and from the Relay PC to the Anchor PC, an "idle mode entry acknowledgement" (IM_Entry_State_Change_Ac) message is sent to acknowledge that the IM_Entry_State_Change_Rsp has been sent;

Steps S610 and S611, the anchor PC notifies an anchor data channel functional entity of an indication that the idle mode has been entered, and the anchor data channel functional entity returns an acknowledgement;

Step S612, the data channel between the services access service network and the anchor data channel functional entity is deleted;

Step S613, a security parameter CMAC_KEY_Count of the air interface is updated.

Instance 3

In this instance, the processing performed in the case that the Anchor PC does not migrate during a location update based on the method illustrated in FIG. 4 is described. The method for negotiating and transmitting location Update time length information provided in this instance comprises the following steps:

Step 1, when receiving a request message indicating a location update sent by an MS, the BS sends a location update request message to a services access service network gateway, the message carrying an idle mode timer length obtained from the MS;

Step 2, the services access service network gateway forwards the location update request message to an anchor paging controller at the network side, and the anchor paging controller acquires security context information from an authenticator at the network side;

Step 3, the anchor paging controller negotiates an idle mode timer length according to a negotiation strategy, supposing the negotiated idle mode timer length differs from the idle mode timer length carried in the deregistration request, then the anchor paging controller sends a location update response carrying the negotiated idle mode timer length to the services access service network gateway;

The negotiation strategy used herein can be the same as that used in step 4 of the instance 2.

Step 4, the services access service network gateway forwards the location update response to the BS which sends a response message carrying the idle mode timer length to the MS to update a security parameter of the air interface and meanwhile sends a location update confirmation message to the services access service network gateway.

Similarly, in step 3 of the above flow, if the negotiated idle mode timer length is the same as the idle mode timer length carried in the location update request, then the message sent to the services access service network gateway by the anchor paging controller and the message sent to the BS by the services access service network gateway are also not required to carry the negotiated length, which indicates that use of the idle mode timer length carried in the deregistration request is agreed by default. The length information may be carried or not carried in the location update response of the BS.

The above processing will be described in detail below.

Figure 7:
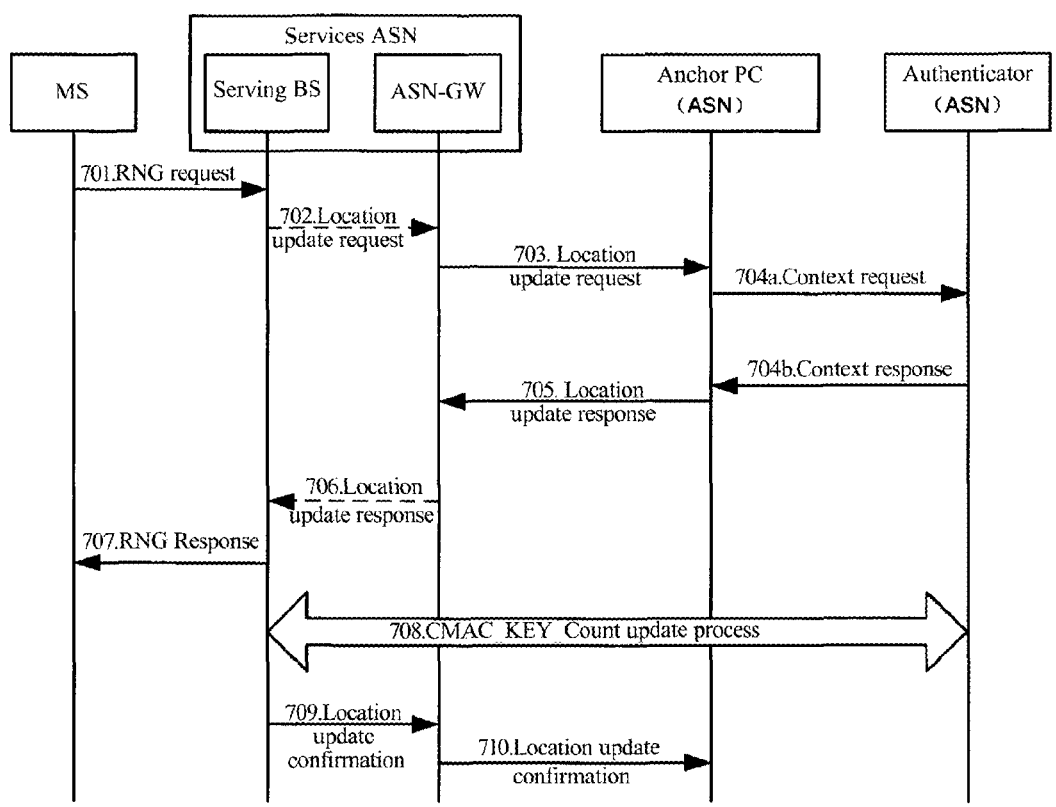
FIG. 7 is a signaling flow chart of processing instance 3 of the method for negotiating and transmitting location update time length information in accordance with the first embodiment of the present invention.

FIG. 7 illustrates a signaling flow of the processing performed in the case that the Anchor PC does not migrate during a location update based on the method illustrated in FIG. 4. As illustrated in FIG. 7, it specifically comprises the following processing:

Step S701, an MS sends a "RNG request" (RNG_REQ) message to the BS to indicate a location update, the message carrying idle mode timer length information;

Step S702, the serving BS sends a "location update request" (LU_Req) message to a services access service network gateway (Relay PC), and adds an Idle Mode Timer field in the message, and the value can be obtained from the RNG_REQ message of the MS and taken as a timer length value that the MS requests to be negotiated;

Step S703, the Relay PC forwards the LU_Req message to an anchor PC;

Steps S704a and S704b, the Anchor PC acquires a security context from an authenticator through a context acquisition flow;

Step S705, the Anchor PC negotiates an Idle Mode Timer value according to a strategy of it, and sends the negotiated Idle Mode Timer value to the Relay PC through a "location update response" (LU_Rsp) message;

Herein, it is also supposed that the negotiated idle mode timer length differs from the idle mode timer length carried in the location update request, and for the processing in the case that they are the same, please refer to the former description.

Step S706, the Relay PC forwards the LU_Rsp message to the BS;

Step S707, the BS sends a "RNG response" (RNG_RSP) message to the MS, the message containing the Idle Mode Timer value negotiated by the Anchor PC;

Step S708, a security parameter CMAC_KEY_Count of the air interface is updated.

Steps S709 and S710, from the BS to the Relay PC and from the Relay PC to the Anchor PC, a "location update confirmation" (LU_Cnf) message is sent to confirm the completion of the location update flow.

Instance 4

In this instance, the processing performed in the case that the Anchor PC migrates during a location update based on the method illustrated in FIG. 4 is described. When an MS initiates a location update in the network where the MS is located, if the anchor paging controller at the network side migrates, then a new anchor paging controller can obtain an idle mode timer length negotiated by the MS from the original anchor paging controller, or the original anchor paging controller actively notifies the new anchor paging controller of the idle mode timer length.

The method for negotiating and transmitting location update time length information provided in this instance comprises the following steps:

Step 1, an MS sends a request message indicating a location update to the BS, the message carrying an idle mode timer length; when receiving the request message, the BS sends a location update request carrying the idle mode timer length obtained from the MS to a services access service network gateway;

Step 2, some relay paging controller at the network side initiates a migration of the anchor paging controller and works as a new anchor paging controller, and the services access service network gateway where the new anchor paging controller resides forwards the location update request to the original anchor paging controller, the message carrying an indication that the Relay paging controller will work as a new anchor paging controller, the original anchor paging controller acquires security context information from an authenticator at the network side and sends the security context information to the new anchor paging controller through a location update response message carrying a negotiated idle mode timer length;

Step 3, the new anchor paging controller negotiates an idle mode timer length according to a negotiation strategy, supposing the negotiated idle mode timer length differs from the idle mode timer length carried in the deregistration request, then the new anchor paging controller sends a location update response carrying the negotiated idle mode timer length to the services access service network gateway;

Herein, the negotiation strategy used by the new anchor paging controller can be using a value preset locally, the value carried in the deregistration request or the negotiated value obtained from the original anchor paging controller.

Step 4, the services access service network gateway forwards the location update response to the BS which sends a response message carrying the idle mode timer length to the MS to update a security parameter of the air interface and meanwhile sends a location update confirmation message to the services access service network gateway; and Step 5, migration to the new anchor paging controller is completed, and the authenticator and the anchor data channel functional entity at the network side are notified.

Similarly, in step 3 of the above flow, if the negotiated idle mode timer length is the same as the idle mode timer length carried in the location update request, then the message sent to the services access service network gateway by the new anchor paging controller and the message sent to the BS by the services access service network gateway are not required to carry the length, which indicates that use of the idle mode timer length carried in the location update request is agreed by default. The length information may be carried or not carried in the location update response of the BS.

The above steps will be described in detail below with reference to the accompanying figure.

Figure 8:
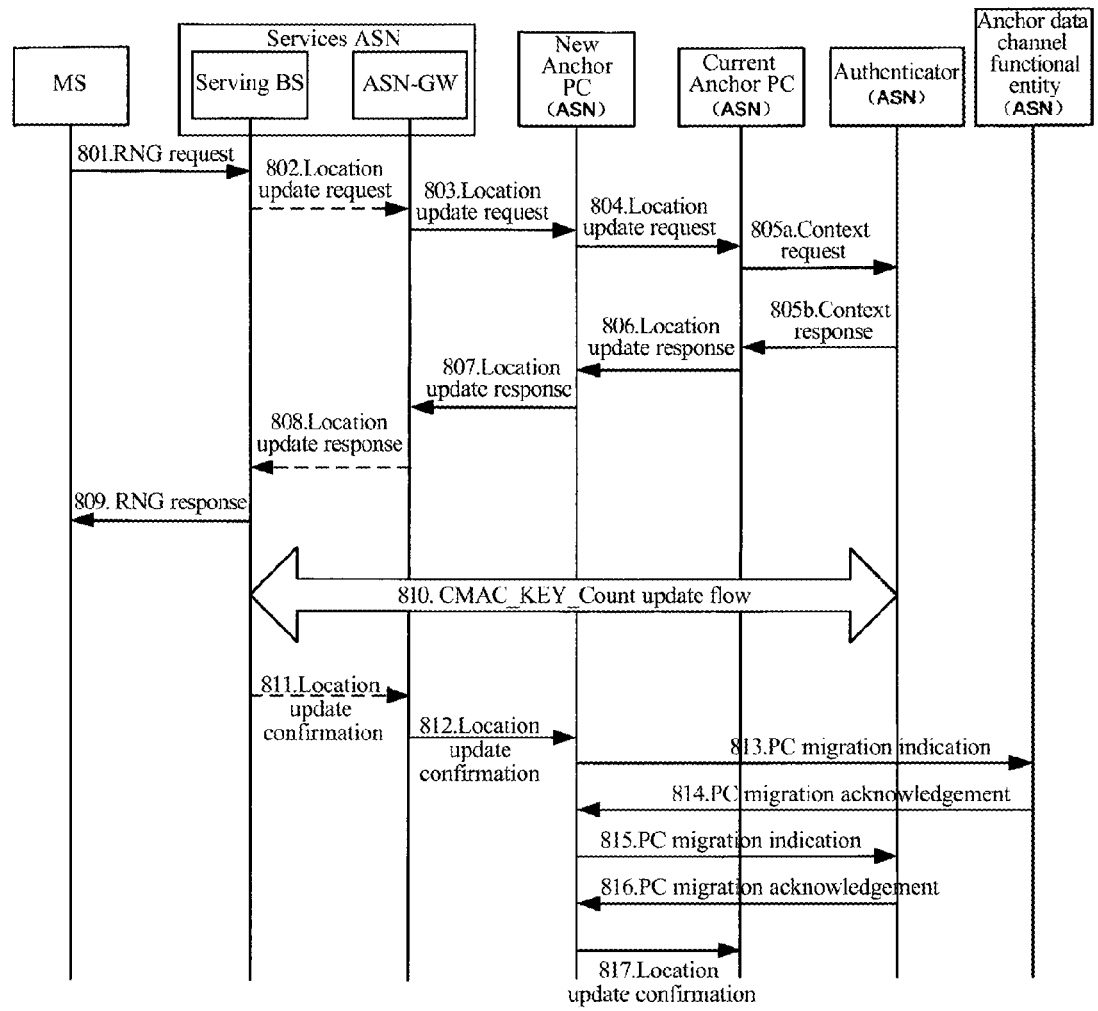
FIG. 8 is a signaling flow chart of processing instance 4 of the method for negotiating and transmitting location update time length information in accordance with the first embodiment of the present invention.

FIG. 8 illustrates a signaling flow of the processing performed in the case that the Anchor PC migrates during a location update based on the method illustrated in FIG. 4. In this case, when the Anchor PC migrates, the original Anchor PC has negotiated an Idle Mode Timer value with an MS, optionally, the negotiated Idle Mode Timer value can be transferred to the new Anchor PC as a reference value during the migration of the Anchor PC, as illustrated in FIG. 8, it specifically comprises the following processing:

Step S801, an MS sends a "RNG request" (RNG_REG) message to the serving BS to indicate a location update, the message carrying an idle mode timer length;

Step S802, the serving BS sends a "location update request" (LU_Req) message to a services access service network gateway (Relay PC), and adds an Idle Mode Timer field in the message, and the value can be obtained from the RNG_REQ of the MS and taken as a timer length value that the MS requests to be negotiated;

Steps S803 and S804, some Relay PC among others decides to initiate a migration of the anchor paging controller (Anchor PC) and works as a new Anchor PC, and loads an indication that the Relay PC will work as a new Anchor PC into the LU_Req, and then forwards the LU_Req message to the original Anchor PC;

Steps S805a and S805b, the original Anchor PC acquires a security context from an authenticator through a context acquisition flow;

Step S806, the original Anchor PC sends the relevant user context to the new Anchor PC through a "location update response" (LU_Rsp) message carrying an Idle Mode Timer value that has successfully been negotiated before;

Step S807, the new Anchor PC negotiates an Idle Mode Timer value according to the Idle Mode Timer value that the MS requests to be negotiated and the Idle Mode Timer value negotiated by the Old Anchor PC and carried in the LU_Rsp, and according to a strategy of it, and sends the timer value to the Relay PC through a LU_Rsp message;

Herein, it is also supposed that the negotiated idle mode timer length differs from the idle mode timer length carried in the location update request, and for the processing in the case that they are the same, please refer to the former description.

Step S808, the Relay PC forwards the LU_Rsp message to the BS;

If there is only one Relay PC and the Relay PC already works as the new Anchor PC, the new Anchor PC can directly send the LU_Rsp message to the BS, and Step S808 can be omitted.

Step S809, the BS sends a "RNG response" (RNG_RSP) message to the MS, the message containing the Idle Mode Timer value negotiated by the Anchor PC;

Step S810, a security parameter CMAC_KEY_Count of the air interface is updated.

Steps S811, S812 and S817, from the BS to the Relay PC, from the Relay PC to the new Anchor PC, and from the new Anchor PC to the original Anchor PC, a "location update confirmation" (LU_Cnf) message is sent to confirm the completion of the location update flow.

Steps S813~S816, the new Anchor PC notifies the authenticator and the anchor data channel functional entity of the completion of the Anchor PC migration, and receives acknowledgement messages.

In the above description, there are a variety of functional entities, such as authenticator, data channel functional entity, relay paging controller, anchor paging controller, and so on, and in the description of the flows, these functional entities correspond to a separate network entity, the services access service network gateway. In actual configuration, these functional entities can reside in the same physical entity, and when these functional entities reside in the same network entity, i.e. the services access service network gateway, the interfaces among these functional entities (internal interfaces) may not be exposed as standard messages.

Figure 9:
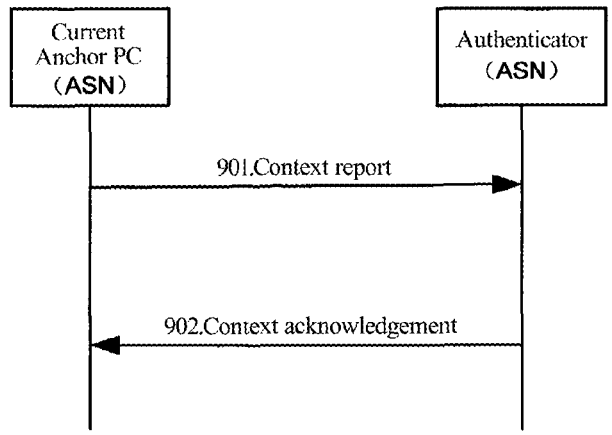
FIG. 9 is a signaling flow chart of idle mode timer length synchronization between an anchor paging controller and an authenticator in accordance with the method for negotiating and transmitting location update time length information in the first embodiment of the present invention.

In this embodiment, if the negotiation of the idle mode timer length is performed when initiating a request for initially accessing a network, the negotiated length value can be stored in the authenticator, and when entering the idle mode later on, the anchor paging controller can obtain this value from the authenticator. Or when the MS initiates a request for initially accessing the network again, the authenticator may directly take the stored value as a negotiated length value. However, since there are multiple negotiations in this embodiment, the length value negotiated by the anchor paging controller may be different from the length value stored in the authenticator. Therefore, when the anchor paging controller sends a new idle mode timer length to the MS, the length value in the authenticator is required to be updated, that is, the following two steps are required to be added at this time, as illustrated in FIG. 9:

Step S901, the current anchor paging controller sends a "context report" (Context_Rpt) message to the authenticator, the message carrying the new idle mode timer length negotiated;

Step S902, the authenticator stores the new idle mode timer length and sends a "context acknowledgement" (Context_Ack) message to the current anchor paging controller.

The Second Embodiment

Figure 10:
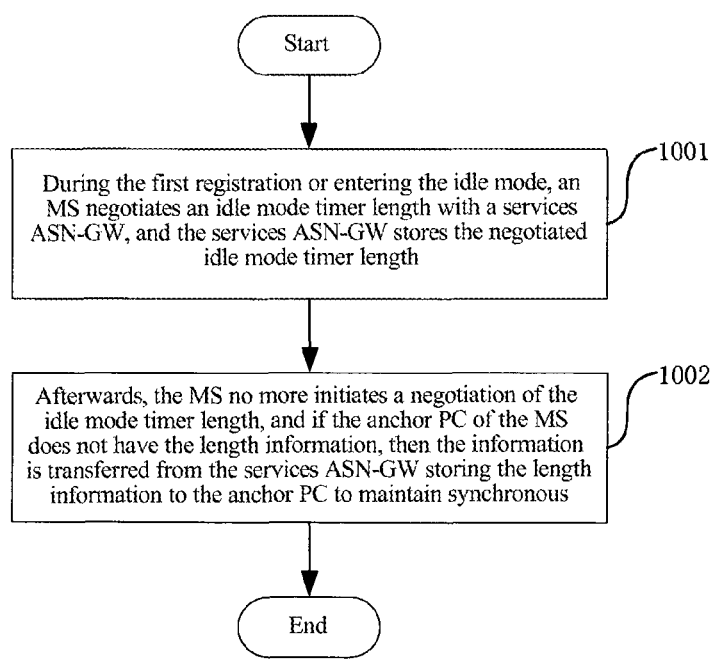
FIG. 10 is a flow chart of a method for negotiating and transmitting location update time length information in accordance with a second embodiment of the present invention.

The method for negotiating and transmitting location update time length information in this embodiment applies the second mode. As shown in FIG. 10, this method comprises:

Step S1001, during the first registration or entering the idle mode, an MS negotiates an idle mode timer length with a services access service network gateway, and the services access service network gateway stores the negotiated idle mode timer length;

During the registration, the negotiation and storage of the above length can be implemented by an authenticator, and during entering the idle mode, it can be implemented by an anchor paging controller.

Step S1002, afterwards, the MS no more initiates a negotiation of the idle mode timer length, and if the anchor paging controller of the MS does not have the idle mode timer length information of the MS, then the information is transferred from the services access service network gateway storing the length information to the anchor paging controller to maintain synchronous.

If the negotiation is performed during the registration, when entering the idle mode, initiating a location update and initiating a request for initially accessing the network again, the length information can be obtained from the authenticator storing the length information, the MS does not need to load the idle mode timer length into corresponding requests, and the anchor paging controller does not need to send the length either. While if the negotiation is performed when entering the idle mode and the anchor paging controller migrates, a new anchor paging controller can obtain the negotiated idle mode timer length from the original anchor paging controller, or the original anchor paging controller actively notifies the new anchor paging controller of the idle mode timer length.

It will be described in detail with several instances.

Instance 5

Supposing an MS has negotiated an idle mode timer with an authenticator when initiating a request for initially accessing a network (the flow of Instance 1 can be applied), this instance describes the processing performed when entering the idle mode based on the method illustrated in FIG. 10, and it comprises the following steps:

Step 1, the mobile station sends a deregistration request indicating entering the idle mode to the base station, and the message does not carry an idle mode timer length;

Step 2, when receiving the deregistration request, the base station sends an idle mode entry state change request message to a services access service network gateway, and the idle mode entry state change request message does not carry an idle mode timer length;

Step 3, the services access service network gateway forwards the idle mode entry state change request message to an anchor paging controller at the network side;

Step 4, the anchor paging controller sends the idle mode entry state change request message to an authenticator, and an idle mode entry state change response message returned by the authenticator comprising a field with the idle mode timer length stored in the authenticator during the user registration;

Step 5, the anchor paging controller uses the idle mode timer length and returns an idle mode entry state change response message to the services access service network gateway, and the message does not contain an idle mode timer length;

Step 6, the services access service network gateway forwards the idle mode entry state change response to the BS, and the BS sends a deregistration response to the mobile station, and meanwhile sends an idle mode entry acknowledgement message to the services access service network gateway; and Step 7, the anchor paging controller notifies an anchor data channel functional entity that the mobile station has entered the idle mode, deletes the data channel between the services access service network gateway and the anchor data channel functional entity, and updates a security parameter of the air interface.

With the above flow, the length information negotiated by the authenticator is sent to the anchor paging controller by the terminal when entering the idle mode.

The above processing will be described in detail below.

In the following description, the signaling message interchange performed during the process of entering the idle mode enables an MS to enter the idle mode, and the process comprises two parts: Steps S601-S608, which mainly relate to the message interchange for entering the idle mode between the MS and a paging controller, and Steps S609-S613, which relate to the release and update of relevant network resource.

This flow is identical with the message interchange illustrated in FIG. 6, except that negotiation of the idle mode timer length is no more performed, and it specifically comprises the following processing:

Step S601, the MS sends a "deregistration request" (DREG_REG) message indicating entering Idle mode to the BS, and the message does not carry an Idle Mode Timer length;

Step S602, the BS sends an "idle mode entry state change request" (IM_Entry_State_Change_Req) message to a services access service network gateway (Relay PC), and the message does not comprise an Idle Mode Timer field;

Step S603, the Relay PC forwards the IM_Entry_State_Change_Req message to an anchor paging controller (Anchor PC);

Step S604, the Anchor PC sends an "idle mode entry state change request" (IM_Entry_State_Change_Req) message to an authenticator to obtain a context associated with the user;

Step S605, the Anchor PC receives an "idle mode entry state change response" (IM_Entry_State_Change_Rsp) message from the authenticator, the message containing an Idle Mode Timer value;

Step S606, the Anchor PC uses the Idle Mode Timer value obtained in Step S605, and an "idle mode entry state change response" (IM_Entry_State_Change_Rsp) message sent to the Relay PC does not carry the Idle Mode Timer value;

Step S607, the Relay PC forwards the IM_Entry_State_Change_Rsp message to the BS;

Step S608, the BS sends a "deregistration response" (DREG_RSP) message to the MS, and since the Idle Mode Timer value is not included in the message this time, the MS will use the Idle Mode Timer value most recently notified by the network side through a "registration response" (REG_RSP), "deregistration response" (DREG_RSP), or "RNG response" (RNG_RSP);

Steps S609a and S609b, an "idle mode entry acknowledgement" (IM_Entry_State_Change_Ack) message is utilized to confirm that the IM_Entry_State_Change_Rsp message has been sent;

Steps S610 and S611, the anchor paging controller notifies an anchor data channel functional entity of an indication that the idle mode has been entered;

Step S612, the data channel between the services access service network and the anchor data channel functional entity is deleted;

Step S613, a security parameter CMAC_KEY_Count of the air interface is updated.

Afterwards, the anchor paging controller and the MS can use the same idle mode timer length to manage, and if the anchor paging controller migrates, the message interchange process in Instance 4 can be utilized for the original anchor paging controller to transfer the stored length value to a new anchor paging controller. But negotiation is no more required and the MS does not need to load the idle mode timer length in the requests either. Detailed description of these is omitted here.

The above description is merely preferred embodiments of the present invention, and is not intended to limit the present invention. For those skilled in the art, the present invention may have various modifications and variations. And without departing from the spirit and principle of the present invention, any modification, equivalent substitution and improvement shall be within the scope the present invention.

INDUSTRIAL APPLICABILITY

The present invention is applicable to a Wimax network architecture, and the negotiation and transmission of location update time length information between access service network gateways as well as between an access service network gateway and a mobile station in a Wimax network make the location update time lengths of the network side and the mobile station maintain consistent.

What we claim is:

1. A method for negotiating and transmitting location update time length information, applied in a Wimax network architecture, the method comprising the following steps of:
   step 1, a mobile station initiating a request for initially accessing a network, a request for entering an idle mode, or a request for a location update to a services access service network gateway, wherein the request for initially accessing the network, the request for entering the idle mode, or the request for the location update carries an idle mode timer length to be negotiated; and
   step 2, when receiving said request, said services access service network gateway negotiating the idle mode timer length, and notifying said mobile station of the negotiated idle mode timer length, before said idle mode timer expires, said mobile station initiating a location update in the network where the mobile station is located, and when the location update is completed, said mobile station and the network where the mobile station is located both resetting said idle mode timer, if said mobile station does not initiate a location update when said idle mode timer expires, the network where the mobile station is located releasing resources associated with said mobile station.

2. A method of claim 1, further comprising:
   the request for initially accessing the network, the request for entering the idle mode, and the request for a location update all carrying idle mode timer length information when these requests are initiated by said mobile station;
   an authenticator or anchor paging controller in the services access service network gateway at the network side performing the negotiation according to a preset negotiation strategy, and sending the negotiated length to the mobile station.

3. A method of claim 1, further comprising:
   during a registration for the first time, said mobile station negotiating an idle mode timer length with an authenticator, and said services access service network gateway storing the idle mode timer length; afterwards, said mobile station no more initiating a negotiation of an idle mode timer length when entering the idle mode or initiating a location update, said authenticator transmitting the length information to an anchor paging controller of said mobile station, and the anchor paging controller which has obtained the length information transmitting the length information to a new anchor paging controller to maintain synchronous; or
   when entering the idle mode, said mobile station negotiating an idle mode timer length with an anchor paging controller, and said anchor paging controller storing the idle mode timer length; afterwards, said mobile station no more initiating a negotiation of an idle mode timer length when initiating a location update, and if the anchor paging controller of said mobile station migrates, then the original anchor paging controller transmitting the length information to a new anchor paging controller to maintain synchronous.

4. A method of claim 1, further comprising:
   said mobile station negotiating the idle mode timer length when initiating the request for initially accessing the network, which comprises the following steps:
   said mobile station accessing the network and sending a registration request to a base station, and said registration request carrying an idle mode timer length;
   said base station initiating a mobile station attachment request to the services access service network gateway, and said mobile station attachment request carrying the idle mode timer length obtained from said mobile station;
   an authenticator in said services access service network gateway negotiating said idle mode timer length according to a negotiation strategy, and notifying said base station through a mobile station attachment response; and
   said base station sending a registration response to said mobile station to notify the mobile station of said idle mode timer length negotiated, and meanwhile sending a mobile station attachment acknowledgement message to said services access service network gateway, so that a data bearer channel is established among said mobile station, said base station and said services access service network gateway.

5. A method of claim 4, further comprising:
   said mobile station no more negotiating an idle mode timer length when initiating the request for entering the idle mode, and the following steps being performed:
   said mobile station sending a deregistration request indicating entering the idle mode to the base station, when receiving said deregistration request, said base station sending an idle mode entry state change request message to the services access service network gateway, and said services access service network gateway forwarding the idle mode entry state change request message to an anchor paging controller at the network side;
   said anchor paging controller sending the idle mode entry state change request message to the authenticator, and an idle mode entry state change response message returned by the authenticator containing the idle mode timer length stored in the authenticator during user registration;

said anchor paging controller using the idle mode timer length, and returning an idle mode entry state change response message to said services access service network gateway, and said services access service network gateway forwarding the idle mode entry state change response message to said base station; or said anchor paging controller directly returning the idle mode entry state change response message to the base station;

said base station sending a deregistration response to said mobile station, and meanwhile sending an idle mode entry acknowledgement message to said services access service network gateway;

said anchor paging controller notifying an anchor data channel functional entity that said mobile station has entered the idle mode, deleting a data channel between said services access service network gateway and said anchor data channel functional entity, and updating a security parameter of an air interface;

wherein, except that the message returned to said anchor paging controller by said authenticator contains the idle mode timer length, other messages do not carry idle mode timer length information.

6. A method of claim 1, further comprising: said mobile station negotiating the idle mode timer length when initiating the request for entering the idle mode, which comprises the following steps:

said mobile station sending a deregistration request indicating entering the idle mode to a base station, and the deregistration request carrying idle mode timer length information;

when receiving said deregistration request, said base station sending an idle mode entry state change request message to the services access service network gateway, and said idle mode entry state change request message carrying the idle mode timer length obtained from said mobile station;

said services access service network gateway forwarding the idle mode entry state change request message to an anchor paging controller at the network side, and said anchor paging controller acquiring security context information from an authenticator;

said anchor paging controller negotiating an idle mode timer length, and notifying said services access service network gateway of the length through an entry state change response message, and said services access service network gateway forwarding said idle mode entry state change response to said base station; or said anchor paging controller directly notifying said base station of the length through the entry state change response message;

said base station notifying said mobile station of the negotiated idle mode timer length through a deregistration response, and meanwhile sending an idle mode entry acknowledgement message to said services access service network gateway;

said anchor paging controller notifying an anchor data channel functional entity that said mobile station has entered the idle mode, deleting a data channel between said services access service network gateway and said anchor data channel functional entity, and updating a security parameter of an air interface.

7. A method of claim 1, further comprising:

when receiving a request message indicating a location update sent by the mobile station, a base station sending a location update request message to the services access service network gateway, and the message carrying the idle mode timer length obtained from said mobile station;

said services access service network gateway forwarding said location update request message to an anchor paging controller at the network side, and said anchor paging controller acquiring security context information from an authenticator at the network side;

said anchor paging controller negotiating an idle mode timer length according to a negotiation strategy, and notifying said services access service network gateway of said idle mode timer length negotiated through a location update response message, and said services access service network gateway forwarding said location update response to said base station; or said anchor paging controller directly notifying said base station of said length negotiated through the location update response;

said base station notifying said mobile station of the negotiated idle mode timer length through a response message, updating a security parameter of an air interface, and meanwhile sending a location update confirmation message to the services access service network gateway.

8. A method of claim 1, further comprising:

said mobile station sending a request message indicating a location update to a base station, and when receiving said request message, said base station sending a location update request message carrying the idle mode timer length obtained from said mobile station to the services access service network gateway;

some relay paging controller at the network side initiating a migration of an anchor paging controller and working as a new anchor paging controller, and a services access service network gateway where the new anchor paging controller resides forwarding the location update request to the original anchor paging controller, and the location update request carrying an indication that the relay paging controller works as the new anchor paging controller;

the original anchor paging controller acquiring security context information from an authenticator at the network side, and sending said security context information to said new anchor paging controller through a location update response message carrying a negotiated idle mode timer length;

said new anchor paging controller negotiating said idle mode timer length according to a negotiation strategy, and notifying said services access service network gateway of the negotiated idle mode timer length through a location update response, and said services access service network gateway forwarding said location update response to said base station; or said anchor paging controller directly notifying said base station of said length negotiated through the location update response;

said base station notifying said mobile station of the negotiated idle mode timer length through a response message, updating a security parameter of an air interface, and meanwhile sending a location update confirmation message to said services access service network gateway; the migration to said new anchor paging controller being completed, and said authenticator and an anchor data channel functional entity at the network side being notified.

9. A method of claim 4, wherein,
a negotiation strategy used by an authenticator or an anchor paging controller in said services access service network gateway is: directly using an idle mode timer length carried in one of the requests, using an idle mode timer length preset locally, or using an idle mode timer length previously negotiated.

10. A method of claim 4, wherein a way in which the negotiated idle mode timer length is notified through a response message is as follows:
if the negotiated idle mode timer length is not a length carried in one of said requests, then the negotiated idle mode timer length is carried in the response message; if the negotiated idle mode timer length is just a length carried in one of said requests initiated by said mobile station, then the length is not carried in the response message, which indicates that use of the length is agreed by default.

11. A method of claim 4, wherein,
in the case that a request initiated by the mobile station carries an idle mode timer length, a response message returned to said mobile station by a base station carries a negotiated idle mode timer length; or if the negotiated idle mode timer length is the length carried in the request initiated by said mobile station, the response message returned to said mobile station does not carry the length, which indicates that use of the length in said request is agreed by default.

12. A method of claim 2, further comprising:
said mobile station negotiating an idle mode timer length when initiating the request for initially accessing the network, and said authenticator storing the negotiated idle mode timer length, afterwards, when said mobile station initiates the request for entering the idle mode, said anchor paging controller obtaining the length from the authenticator; or when said mobile station initiates a request for initially accessing the network again, during a negotiation, the authenticator directly taking the length stored as a negotiated length.

13. A method of claim 12, further comprising:
when the anchor paging controller of said mobile station initiates a request for entering the idle mode and a request for a location update, and said anchor paging controller sends a new idle mode timer length to the mobile station, said anchor paging controller needing to update the length value in the authenticator, that is, sending a context report message carrying the new idle mode timer length negotiated to said authenticator; said authenticator storing the new idle mode timer length and sending a context acknowledgement message to said anchor paging controller.

14. A method of claim 4, wherein,
when the negotiated idle mode timer length is notified through a response message, no matter whether the negotiated idle mode timer length is a length carried in one of the requests initiated by said mobile station or not, the negotiated idle mode timer length is carried in the response message.

15. A method of claim 6, wherein,
a negotiation strategy used by an authenticator or an anchor paging controller in said services access service network gateway is: directly using an idle mode timer length carried in one of the requests, using an idle mode timer length preset locally, or using an idle mode timer length previously negotiated.

16. A method of claim 7, wherein,
a negotiation strategy used by an authenticator or an anchor paging controller in said services access service network gateway is: directly using an idle mode timer length carried in one of the requests, using an idle mode timer length preset locally, or using an idle mode timer length previously negotiated.

17. A method of claim 6, wherein a way in which the negotiated idle mode timer length is notified through a response message is as follows:
if the negotiated idle mode timer length is not a length carried in one of said requests, then the negotiated idle mode timer length is carried in the response message; if the negotiated idle mode timer length is just a length carried in one of said requests initiated by said mobile station, then the length is not carried in the response message, which indicates that use of the length is agreed by default.

18. A method of claim 7, wherein a way in which the negotiated idle mode timer length is notified through a response message is as follows:
if the negotiated idle mode timer length is not a length carried in one of said requests, then the negotiated idle mode timer length is carried in the response message; if the negotiated idle mode timer length is just a length carried in one of said requests initiated by said mobile station, then the length is not carried in the response message, which indicates that use of the length is agreed by default.

19. A method of claim 6, wherein,
in the case that a request initiated by the mobile station carries an idle mode timer length, a response message returned to said mobile station by a base station carries a negotiated idle mode timer length; or if the negotiated idle mode timer length is the length carried in the request initiated by said mobile station, the response message returned to said mobile station does not carry the length, which indicates that use of the length in said request is agreed by default.

20. A method of claim 7, wherein,
in the case that a request initiated by the mobile station carries an idle mode timer length, a response message returned to said mobile station by a base station carries a negotiated idle mode timer length; or if the negotiated idle mode timer length is the length carried in the request initiated by said mobile station, the response message returned to said mobile station does not carry the length, which indicates that use of the length in said request is agreed by default.

21. A method of claim 6, wherein,
when the negotiated idle mode timer length is notified through a response message, no matter whether the negotiated idle mode timer length is a length carried in one of the requests initiated by said mobile station or not, the negotiated idle mode timer length is carried in the response message.

22. A method of claim 7, wherein,
when the negotiated idle mode timer length is notified through a response message, no matter whether the negotiated idle mode timer length is a length carried in one of the requests initiated by said mobile station or not, the negotiated idle mode timer length is carried in the response message.

* * * * *